UNITED STATES PATENT OFFICE.

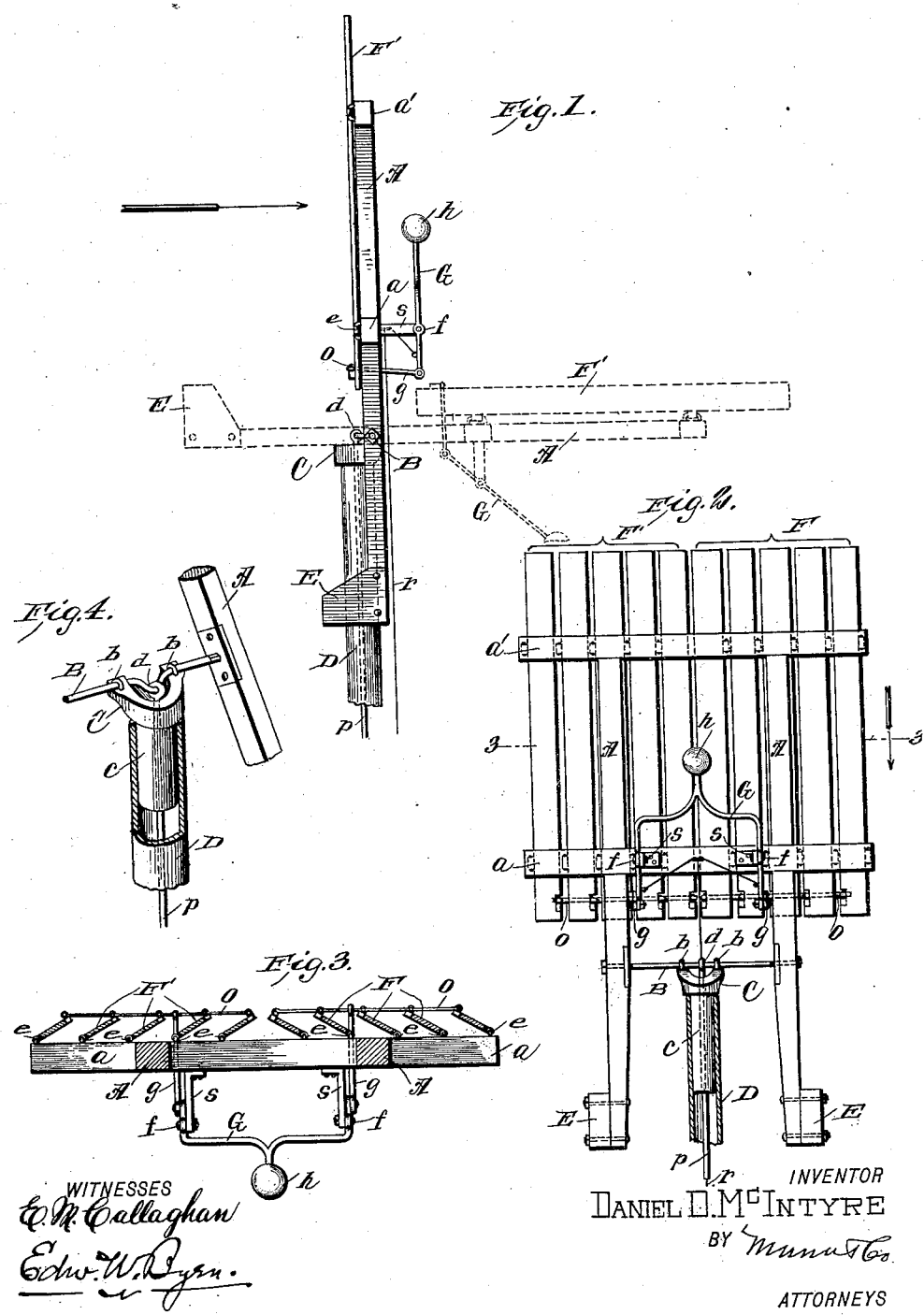

DANIEL DUNCAN McINTYRE, OF BUCKLIN, KANSAS.

OSCILLATING WIND-MOTOR.

No. 890,440.

Specification of Letters Patent.

Patented June 9, 1908.

Application filed January 29, 1908. Serial No. 413,191.

*To all whom it may concern:*

Be it known that I, DANIEL DUNCAN MC-INTYRE, a citizen of the United States, residing at Bucklin, in the county of Ford and State of Kansas, have invented a new and useful Improvement in Oscillating Wind-Motors, of which the following is a specification.

My invention is in the nature of a wind motor of that type in which an oscillating frame is arranged upon a horizontal axis and is provided with blades that are alternately turned flatwise and edgewise to the wind and the force of the wind is applied directly to produce the oscillation of said frame.

The invention consists in the novel construction and arrangement of parts for shifting the blades as hereinafter described in connection with the drawings, in which Figure 1 is a side elevation. Fig. 2 a rear elevation. Fig. 3 is a cross section on line 3—3 of Fig. 2, and Fig. 4 is a perspective detail partly in section of the upper end of the supporting standard and rocking crank shaft.

In the drawing, A is a frame composed of two vertical and parallel side bars connected by two cross bars $a\ a'$. Between the lower extended ends of the side bars is rigidly connected the horizontal rock shaft B, whose ends are squared and fitted by nuts and plates to the side bars so that said shaft cannot turn in the side bars but has a strong and rigid connection therewith. This shaft is journaled in bearings $b\ b$ upon the top of a collar C attached to a tube section $c$, Fig. 4, which enters the top of a pipe D which forms the supporting standard or mast on which my motor is carried. At a point between the bearings $b\ b$ the shaft is bent into a crank $d$, to which is attached the connecting rod $p$ of a pump or other mechanism to be operated, said connecting rod passing down through the collar C and the tubular standard to a suitable point below.

To the lower ends of the side bars are attached two heavy weights E E. The wind motor is designed to oscillate about the axis of shaft B, from a nearly horizontal position to a vertical position. The wind effects the direct deflection of the frame backward and away from the wind, as seen in Fig. 1, in dotted lines, and the weights E restore the frame to the vertical position again.
To render the above described action automatic and continuous, two series of vertical blades F F' are hinged at one longitudinal edge $e$ to the cross bars of the frame and to the outer or swinging edge of each series of blades a transverse bar $o$ is loosely coupled so that when this bar is moved longitudinally in one direction it will turn the blades flat face to the wind, and when moved in the other direction it will turn the blades edgewise to the wind. When the blades have their flat faces to the wind the force of the latter tilts the whole frame toward the horizontal position and when the blades are turned edgewise to the wind, they then offer practically no resistance to the wind and the weights E bring the frame back to the vertical position again.

To make the change in the plane of the blades at the end of each stroke, a forked lever G has its two branches fulcrumed at $f\ f$ to off-setting supports $s\ s$ on the lower cross bar. The lower branched ends of this lever are connected by link bars $g\ g$ with the two transverse bars $o\ o$ and the upper end of said lever is provided with a weight $h$. When the main frame is vertical the lever G is vertical and the blades are flat face to the wind. Now when the main frame swings rearwardly and downwardly toward the horizontal, from the pressure of the wind, the weight $h$ swings away from the main frame from the combined influences of gravity and inertia and this causes the lower branched ends of the lever G to approach the main frame and turn the free edges of the blades edgewise to the wind. As soon as this takes place, the blades no longer feeling the pressure of the wind, the operating weights E E restore the frame to the vertical position. As the frame swings to the vertical position the weight $h$ swings toward the frame from its inertia and the lower forked ends close the blades flat wise to the wind for a repetition of the former action. In this way the oscillations of the main frame are made continuous by the automatic action of the shifting weight.

To throw the motor out of action, the blades are adjusted and held edge wise to the wind by means of a rope $r$ which connects with the shifting lever and extends through suitable guide eyes down beside or through the collar and hollow vertical standard.

It will be seen that the lower forked ends of the lever are spread apart a considerable distance which gives a long axial fulcrum for the lever, which reduces wear and looseness and maintains the true plane of oscillation of the lever with a minimum of friction and moving parts, the lower end of one branch being connected to and operating the half of the blades on one side of the middle line and the lower end of the other branch operating the half of the blades on the other side of the middle line.

I claim

1. An oscillating wind motor comprising an upright frame having a horizontal axis of oscillation and hinged blades and a shifting lever constructed with branched and spaced apart lower ends fulcrumed to the upright frame, means for connecting these branched ends to the blades and a weight mounted upon the upper end of said lever.

2. An oscillating wind motor comprising an upright frame having a horizontal axis of oscillation and hinged blades and a shifting lever constructed with branched and spaced apart lower ends fulcrumed to the main frame, means for connecting these branched ends to the blades and a weight mounted upon the upper end of said lever, the blades being arranged in two groups with separate connecting bars and the two branched ends of the lever being separately connected to the two groups.

DANIEL DUNCAN McINTYRE.

Witnesses:
MARGARET KANE,
A. B. GRESHAM.